United States Patent
Yeung (10) Patent No.: US 9,310,844 B2
(45) Date of Patent: Apr. 12, 2016

(54) STABILIZATION AND EASY REPOSITIONING OF A DISPLAY

(71) Applicant: Acer Incorporated, New Taipei (TW)

(72) Inventor: Sip Kim Yeung, Taipei (TW)

(73) Assignee: ACER INCORPORATED, New Taipei (TW)

(*) Notice: Subject to any disclaimer, the term of this patent is extended or adjusted under 35 U.S.C. 154(b) by 552 days.

(21) Appl. No.: 13/738,084

(22) Filed: Jan. 10, 2013

(65) Prior Publication Data

US 2014/0098479 A1    Apr. 10, 2014

(30) Foreign Application Priority Data

Oct. 4, 2012   (TW) .............................. 101136720 A (51) Int. Cl.
*H05K 5/00* (2006.01)
*G06F 1/16* (2006.01)

(52) U.S. Cl.
CPC ............ *G06F 1/1637* (2013.01); *G06F 1/1679* (2013.01)

(58) Field of Classification Search
CPC . B60K 2350/405; G09F 19/02; G09F 1/1616; G09F 1/1681
See application file for complete search history.

(56) References Cited

U.S. PATENT DOCUMENTS

| | | | |
|---|---|---|---|
| 2004/0012920 A1* | 1/2004 | Tanimoto et al. | 361/683 |
| 2008/0158800 A1 | 7/2008 | Aoyagi | |
| 2009/0144934 A1 | 6/2009 | Kitagawa et al. | |
| 2011/0038118 A1* | 2/2011 | Sip et al. | 361/679.27 |
| 2012/0162889 A1 | 6/2012 | Han | |
| 2014/0247549 A1* | 9/2014 | Senatori | 361/679.27 |

FOREIGN PATENT DOCUMENTS

WO    2011113145 A1    9/2011

OTHER PUBLICATIONS

European Search Report, 13152806.9, Feb. 2, 2015, 8 pages.

* cited by examiner

*Primary Examiner* — Robert J Hoffberg
*Assistant Examiner* — Hung Dang
(74) *Attorney, Agent, or Firm* — Edell, Shapiro & Finnan, LLC (57) ABSTRACT

Techniques applied to a computing device having a display, a base, and components that allow repositioning of the display relative to the base are provided, which can be used for stabilizing and changing the position of the display relative to the base. A determination is made via a processor as to when the display is changing position relative to the base. A determination is also made via the processor as to when a stabilizing portion of the display is in contact with a stabilizing portion of the base. A force between the stabilizing portion of the display and the stabilizing portion of the base is decreased when the display is changing position relative to the base and when the stabilizing portion of the display is in contact with the stabilizing portion of the base.

20 Claims, 10 Drawing Sheets

STABILIZATION AND EASY REPOSITIONING OF A DISPLAY

FOREIGN PRIORITY

This application claims the benefit of priority of Taiwanese Patent Application No. 101136720, filed on Oct. 4, 2012, the contents of which are incorporated herein by reference.

TECHNICAL FIELD

The present disclosure relates to stabilization and easy repositioning of displays.

BACKGROUND

Notebook computers, in particular lightweight "ultrabooks," have gained widespread use as a preferred form factor for general purpose computing devices, often replacing desktop computers altogether. As is well known, the displays of notebook devices may be repositioned to find a preferred viewing angle or to place the notebook in a better configuration for travel or storage.

The success of tablet devices has resulted in a shift from computing environments in which a user interacts with a mouse and keyboard to touch-based environments where a user interacts in the environment by touching, tapping and gesturing on a touch sensitive display. Nevertheless, some traditional interface devices, such as keyboards, may never be completely replaced by touch sensitive methods of interacting with a computing environment. Accordingly, "convertible" notebooks, which may be converted from a traditional notebook or ultrabook configuration to a tablet configuration are gaining popularity. These convertible notebooks may implement touch-based interfaces even when in a notebook configuration, requiring users to interact by touching, tapping and gesturing on the notebook screen.

SUMMARY

Techniques applied to a computing device having a display, a base, and components that allow repositioning of the display relative to the base are provided are provided for stabilizing and changing the position of the display relative to the base. The techniques may be embodied as a method, an apparatus or a computer-readable storage media with instructions executable to perform the method. In summary, a determination is made via a processor as to when a display is changing position relative to a base. A determination is also made via the processor as to when a stabilizing portion of the display is in contact with a stabilizing portion of the base. A force between the stabilizing portion of the display and the stabilizing portion of the base is decreased when the display is both changing position relative to the base and a stabilizing portion of the display is in contact with the stabilizing portion of the base.

DESCRIPTION OF EXAMPLE EMBODIMENTS

Figure 1A:
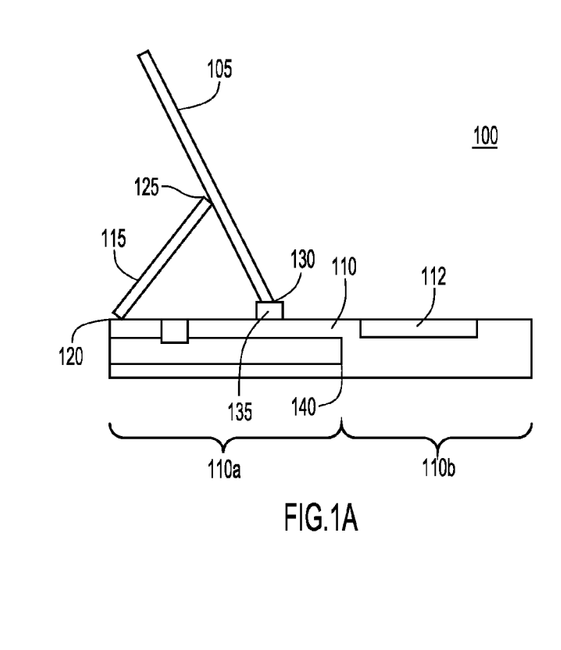
FIGS. 1a-d illustrate a computing device comprising a display, a base, and components that allow repositioning of the display relative to the base, as well as some of the forces present when repositioning and stabilizing the display.
Figure 1B:
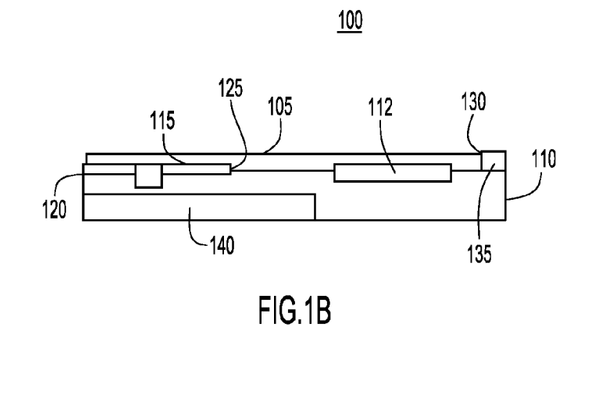
Figure 1C:
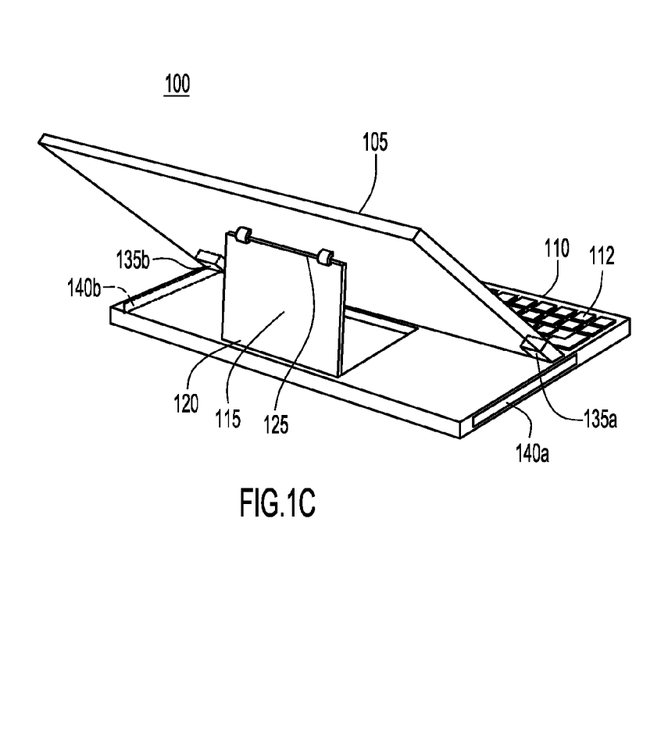
Figure 1D:
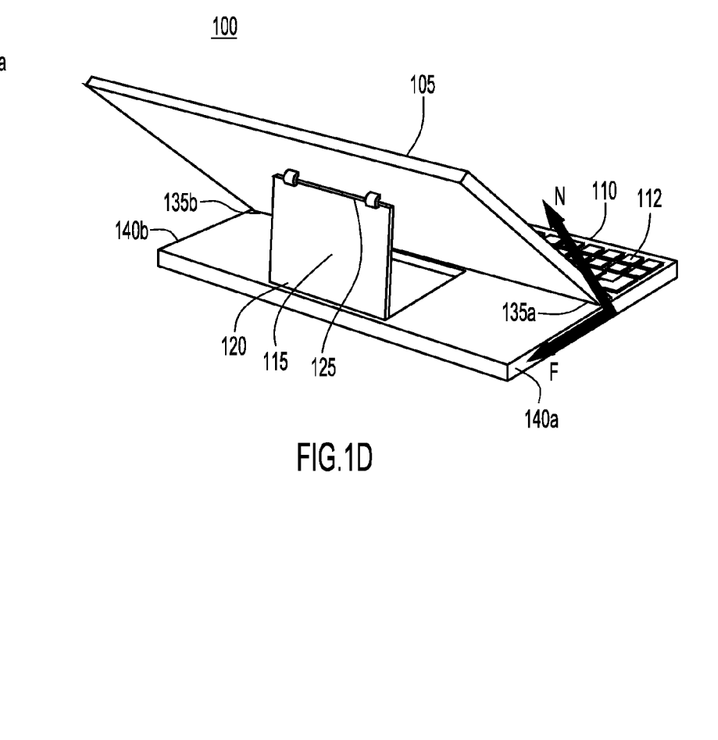

Depicted in FIGS. 1a-d is a computing device 100. The computing device comprises a display 105 and a base 110. Computing device 100 is depicted as a convertible computing device which may be oriented in a notebook configuration, depicted in FIG. 1a, or a tablet configuration as depicted in FIG. 1b. It is noted that the techniques described herein may be applied to other types of displays and bases. The notebook configuration of FIG. 1a may be better suited to content creation, providing user access to keyboard 112, while the tablet configuration of FIG. 1b may be better suited to content consumption. To convert from the notebook configuration of FIG. 1a to the tablet configuration of FIG. 1b, and vice versa, support 115 is attached to base 110 with base hinge 120, and is attached to display 105 with display hinge 125. Accordingly, hinges 120 and 125 allow display 105 to slide along base 110.

Specifically, to change the viewing angle of display 105, peripheral portion 130 slides to different positions along the top surface of base 110. Moving peripheral portion 130 closer to keyboard 112 arranges display 105 at a shallower viewing angle, while moving peripheral portion 130 towards the back of base 110 arranges display 105 at a steeper viewing angle. Base 110 may be considered to have two separate portions, a first portion 110a where peripheral portion 130 will be located when a user sets display 105 for use in a notebook configuration, and a second portion 110b that includes areas where peripheral portion 130 is located when display 105 is either in a tablet configuration, or where the position of display 105 does not allow use in the notebook configuration (e.g. positions where keyboard 112 is partially covered by display 105).

In order to be effective, screen 105 must be stabilized in a desired position during use, and in the first portion 110a specifically, even in a touch-based computing environment. In a touch-based environment users touch, tap, and gesture on display 105 to interact in the computing environment. If display 105 is not adequately stabilized at a desired viewing angle, the touches and gestures used to interact in the computing environment may inadvertently change the viewing angle of display 105. On the other hand, if a user wishes to change the viewing angle of display 105, or convert computing device 100 from a notebook configuration to a tablet configuration, the user should be able to easily slide display 105 relative to base 110. Accordingly, computing device 100 is configured to stabilize screen 105 in a chosen position unless it is determined that a user wishes to change the position of the screen, and is not simply gesturing on the screen to interact in the computing environment. This determination is made by determining if display 105 is changing position relative to base 110, making an additional determination as to whether or not display 105 is arranged so that peripheral portion 130 is within first portion 110a, and finally, decreasing a force between peripheral portion 130, and the top surface of base 110 corresponding to first portion 110a. Each of these elements of display 100 will be discussed in detail below, beginning with how display 105 is stabilized in a desired position.

In order to stabilized or secure display 105 at a chosen display angle, magnets 135a and 135b are incorporated into the structure of display 105, and as depicted in FIGS. 1a-d, arranged in peripheral portion 130. Furthermore, metal strips 140a and 140b are arranged in base 110. Metal strips 140a and 140b may be made from a ferromagnetic material so they may be attracted to magnet 135. Accordingly, when magnets 135a and 135b overlap portions of metal strips 140a and 140b (e.g. magnet 135a overlaps metal strip 140a in a direction normal the to sliding direction of display 105 relative to the base 110), respectively, the normal force N between peripheral portion 130 and the top surface of base 110 is increased. The increased normal force N increases the frictional force F. As a result, more force is required to slide peripheral portion 130 along the top surface of base 110. As display 105 can be stabilized through magnet 135 when it is contact with a portion of base 110 in which magnets 140 are located, peripheral portion 130 may be considered a stabilizing portion of display 105. Similarly, the portions of base 110 in which magnets 140 are located may be considered stabilizing portions of the base 110.

Magnets 135a and 135b may be selected such that the attractive force between magnet 135a-b and metal strips 140a-b sufficiently increases the friction force F so that the forces applied when a user touches, taps and gestures on screen 105 are insufficient to change the position of display 105. Accordingly, with magnets 135a-b and metal strips 140a-b firmly holding display 105 in place, a user may interact with computing device 100 without inadvertently changing the viewing angle of display 105.

Figure 2A:
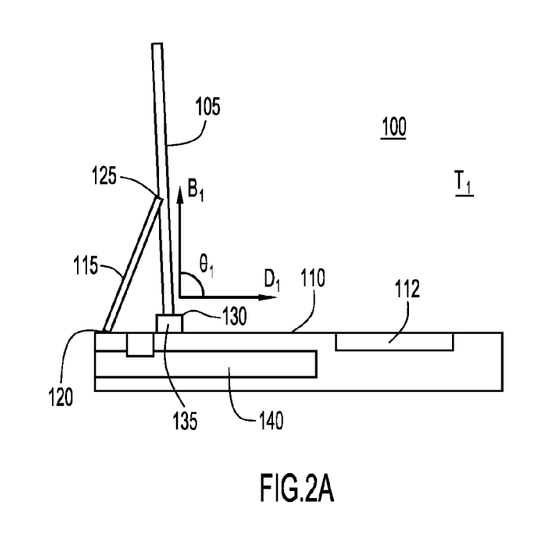
FIGS. 2a-b illustrate a computing device at a first time and the same computing device at a second time at which the position of a display relative to a base has changed.
Figure 2B:
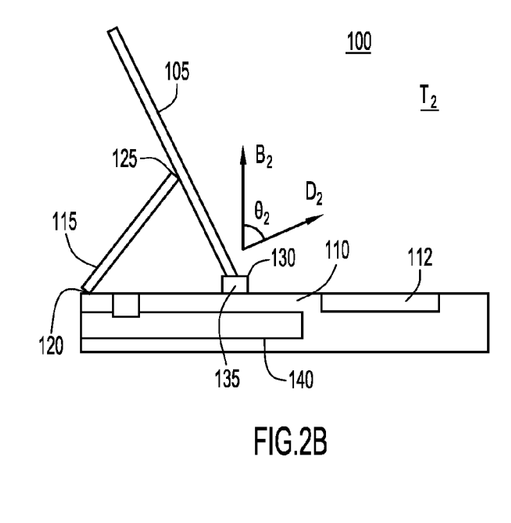

With reference now made to FIG. 2a-b, depicted therein is a process by which computing device 100 determines when display 105 is moved relative to base 110. Specifically, at time $T_1$ in FIG. 2a, a first vector $B_1$ is determined. Vector $B_1$ is indicative the position (i.e. spatial orientation) of base 110. Vector $B_1$ points in a direction normal to the top surface of base 110. According to other examples, $B_1$ may point in a different direction, for example, a direction within the plane of base 110. A vector $D_1$ which is indicative of the position (i.e. spatial orientation) of display 105 is also determined. Vector $D_1$ is normal to the front surface of display 105, but other directions may also be used. From vectors $B_2$ and $D_2$ an angle $\theta_1$ is determined which is the angle between vectors $B_2$ and $D_2$, and is indicative of the relative positions of screen 105 and base 110 at time $T_1$. At time $T_2$ in FIG. 2b, a vector $B_2$ is determined which is indicative of the position of base 110, and a vector $D_2$ is determined which is indicative of the position of display 105. From $B_2$ and $D_2$ an angle $\theta_2$ is determined which is indicative of the relative positions of screen 105 and base 110 at time $T_2$. By comparing $\theta_1$ and $\theta_2$ it can be determined whether or not the viewing angle of display 105 has changed.

Specifically, a difference between $\theta_1$ and $\theta_2$ is an indication that a user has applied enough force to overcome the additional frictional force supplied by magnet 135 and metal strip 140, and thereby slide peripheral portion 130 along the top surface of base 110. In other words, because the force a user applies when making touches, taps and gestures in a touch-based computing environment are unlikely to supply sufficient force to overcome the additional frictional force supplied by magnet 135 and metal strip 140, when sufficient force is applied to actually move display 105 relative to base 110, a reasonable determination may be made that the user is attempting to reposition display 105.

While methods other than determining a difference between $\theta_1$ and $\theta_2$ may be used to determine whether or not display 105 is moving relative to base 110, the method should be chosen to ensure relative motion between the display 105 and base 110 may be distinguished from motion of the entire computing device 100. For example, if a user were to lift, carry or otherwise move the entire computing device 100, there may be a difference between vectors $D_1$ and $D_2$ and also a difference between vectors $B_1$ and $B_2$, but this would be insufficient to show a change in the relative positions of display 105 and base 110. Accordingly, if only the vectors are considered, and not the angle between them, lifting computing device 100 may result in an undesired change in position of display 105.

Figure 3:
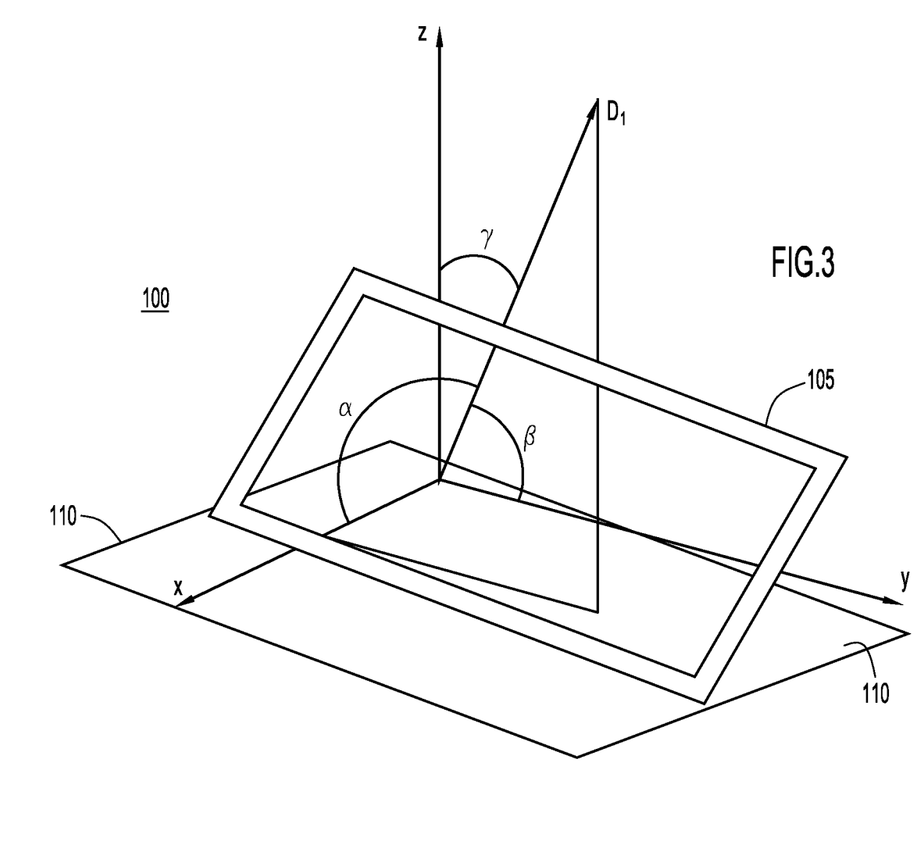
FIG. 3 illustrates a computing device and a set of axes against which the relative positions of a display and a base may be determined.

Turning to FIG. 3, depicted therein is an illustration of how a vector indicative of the position of either display 105 or base 110 may be determined. Specifically, an accelerometer, a magnetometer, a gyroscope, or a combination thereof oriented within the display 105 or base 110 may be used to determine the orientation of the device. For example, if a single 3-axis accelerometer is used, the orientation of the device is determined based on the magnitude of its acceleration in each of the three axes directions, x, y and z, with the orientation vector $D_1$ being determined from the three angles, $\alpha$, $\beta$ and $\gamma$. If additional accelerometers, magnetometers, and/or gyroscopes are used, additional axes may be used to more accurately determine the orientation of a base 110 or a display 105. For example, if one each of an accelerometer, a magnetometer, and a gyroscope are used, an extremely accurate determination of the orientation of the device may be determined.

Figure 4A:
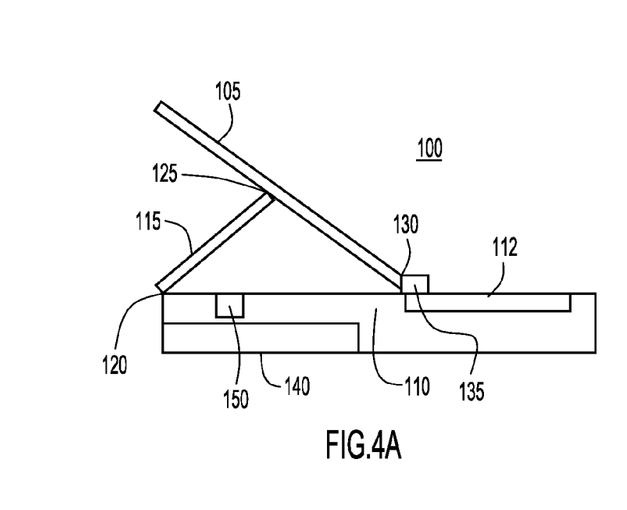
FIGS. 4a-c illustrate a switch that may be used when sliding or stabilizing a display relative to a base.
Figure 4B:
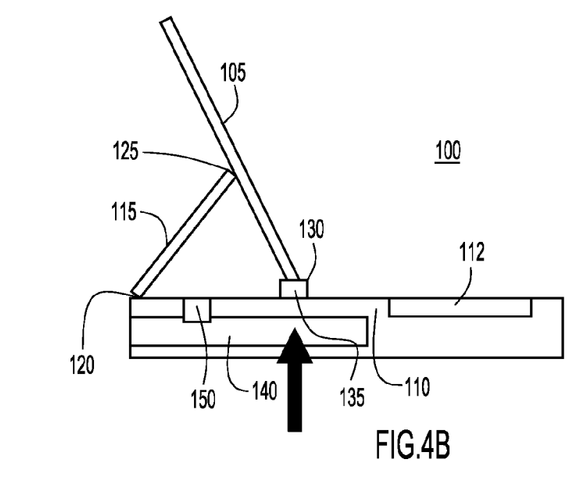
Figure 4C:
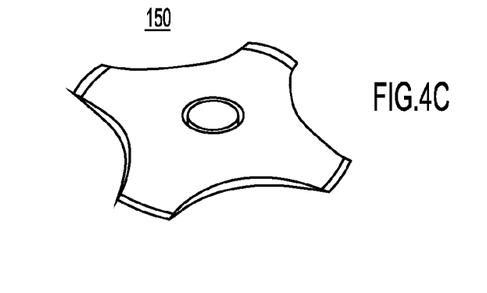

With reference now made to FIGS. 4a-c, depicted therein is an example method for determining whether or not a stabilizing portion of display 105 is in contact with a stabilizing portion of the base 110. Specifically, an illustration is provided which shows how it may be determined that peripheral portion 130 of display 105 is in contact with portions of base 110 corresponding to metal strips 140.

It may be insufficient to only determine whether or not display 105 is moving relative to base 110. For example, in FIG. 4a, display 105 may be moving relative to base 110, but peripheral portion 130, and therefore magnet 135, does not overlap with metal strip 140. Accordingly, the force, if any, between magnet 135 and metal strip 140 has little or no effect on the ability to slide display 105 relative to base 110. As discussed above, when changing the viewing angle of display 105, or converting computing device 100 from a notebook configuration to a tablet configuration, a user should be able to easily slide display 105 relative to base 110. Easily sliding display 105 relative to base 110 may require altering the frictional force between display 105 and 110. One method of altering the frictional force is to decrease the contributions of the attraction between magnet 135 and metal strip 140 to the frictional force. But, as will be shown below, altering the forces between magnet 135 and metal strip 140 requires power. Therefore, altering the forces between magnet 135 and metal strip 140 when they do not substantially contribute to the sliding frictional force may unnecessarily negatively affect the battery life for computing device 100. Accordingly, it may be beneficial to determine if magnet 135 overlaps metal strip 140 before altering the force between them.

In order to determine when peripheral portion 130 overlaps metal strips 140, computing device 100 includes a switch 150. Switch 150 is placed such that when peripheral portion 130 overlaps metal strips 140, the switch is tripped. In the example of FIG. 4c, switch 150 comprises a dome switch. Switch 150 may be arranged within base 110 on a display-side of metal strips 140, as illustrated in FIGS. 4a and b. Metal strips 140 are arranged so that they may travel relative to base 110, specifically between a position in which switch 150 is not tripped, as illustrated in FIG. 4a, and a position in which switch 150 is tripped, as depicted in FIG. 4b. Because metal strip 140 is allowed to travel relative to base 110, when peripheral portion 130, and therefore magnet 135, overlap metal strip 140, the magnetic force produced by magnet 135 causes metal strip 140 to move vertically, and trip switch 150. Because the presence of magnet 135 overlapping metal strip 140 results in switch 150 being tripped, the tripping of switch 150 may be used as a reliable indication that a stabilizing portion of display 105 is in contact with a stabilizing portion of base 110.

While switch 150 may be used to determine when magnet 135 overlaps metal strip 140 while stabilizing screen 105, other switches or methods may be used to determine when magnet 135 overlaps metal strip 140 when the magnetic force between them is being decreased. For example, switches at hinges 120 and 125 may be used to determine if magnet 135 overlaps metal strip 140 when the magnetic field of the magnet is being decreased or cancelled altogether.

According to other examples, a switch may be placed at one or both of hinges 120 and 125 which have been calibrated to be tripped when peripheral portion 130 is in contact with a portion of base 110 that overlaps metal strip 140. Other examples may include measuring a current produced in metal strip 140 by the movement of magnet 135 as an indication that peripheral portion 130 is in contact with a portion of base 110 that overlaps metal strip 140.

Figure 5:
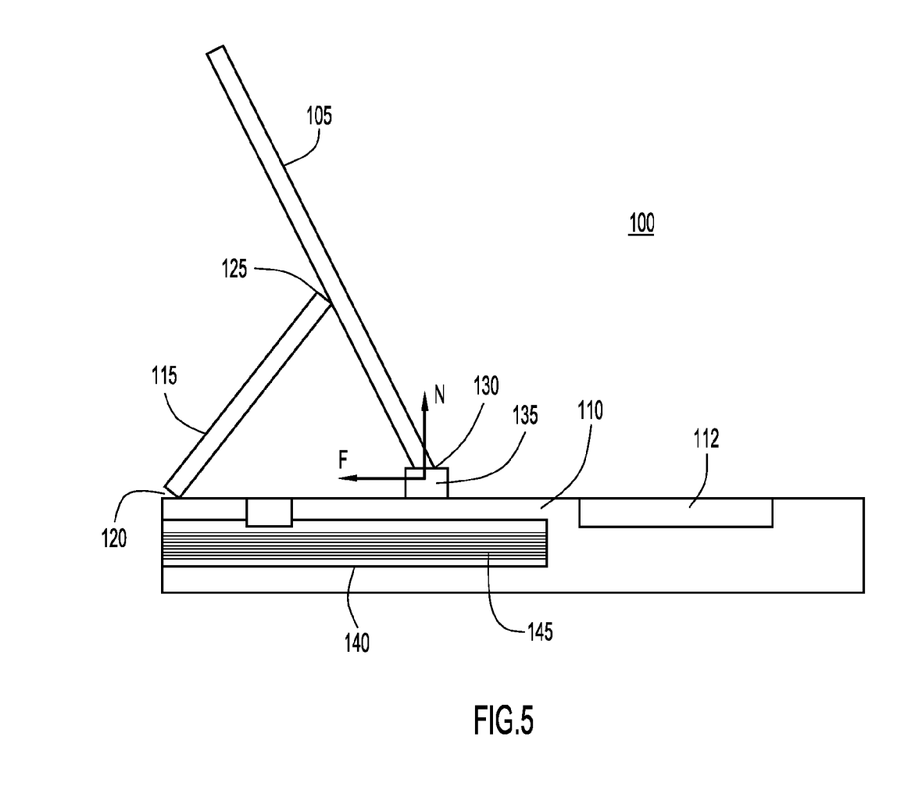
FIG. 5 illustrates a first example arrangement of a solenoid within a computing device that allows for stabilization and easy sliding of a display of the computing device.

Turning to FIG. 5, depicted therein is an illustration of how computing device 100 allows display 105 to slide more easily when it is determined that a user is attempting to change the display angle of display 105. Specifically, having determined that the user wishes to change the angle of display 105, and also having determined that a stabilizing portion of display 105 is in contact with a stabilizing portion of base 110, computing device 100 lessens the force needed to slide display 105 along a top surface of base 110. In particular, the normal force N is decreased, thereby decreasing the frictional force F, and allowing display 105 to slide over base 110 more easily. Computing device 100 of FIG. 4 decreases the normal force N by decreasing or eliminating the magnetic force between magnets 135 and metal strips 140. Specifically, solenoid 145 surrounds metal strip 140. By appropriately designing and supplying current to solenoid 145, the magnetic force between magnet 135 and metal strip 140 can be cancelled, decreasing the normal force N, and thereby decreasing the frictional force F. With the frictional force decreased, display 105 may easily slide over the top surface of base 110.

Figure 6:
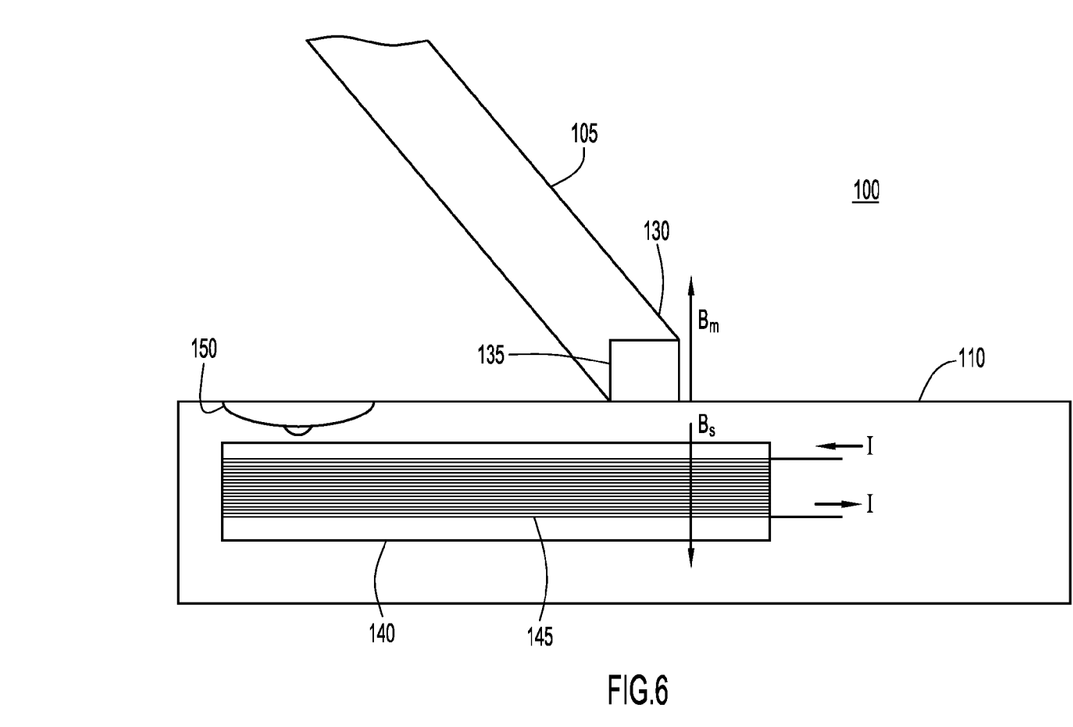
FIG. 6 illustrates a detailed view of the first example arrangement of the solenoid.

With reference now made to FIG. 6, depicted therein is a close-up view of magnet 135, metal strip 140 and solenoid 145. Magnet 135 comprises a permanent magnet, and therefore, always provides a magnetic field. Accordingly, magnet 135 will normally attract metal strip 140. To counteract this force, solenoid 145 is placed around metal strip 140, allowing metal strip 140 and solenoid 145 to act as an electromagnet when current is supplied to solenoid 145. The magnetic field $B_s$ created by solenoid 145 is determined by:

$$B_s = k\mu n I \qquad \text{(Equation 1)}$$

Where $\mu$ is an electric constant, n is the number of turns of wire, I is the current, and k is a factor based upon the material in the interior of the solenoid, i.e., the material used to construct metal strip 140. Because k, $\mu$, n and I can all be determined, the magnetic field $B_s$ created by solenoid 145 may be chosen such that it cancels out the magnetic field $B_m$ created by magnet 135. With the magnetic fields cancelled, the force between magnet 135 and metal strip 140 can be eliminated, thereby decreasing the frictional force between the peripheral portion 130 of the display 105 and at top surface of base 110. With the frictional force decreased, display 105 may more easily slide across the top surface of base 110. Furthermore, according to other examples, the magnetic field $B_s$ created by solenoid 145 can be made greater in magnitude than magnetic field $B_m$, causing magnet 135 to be repelled by solenoid 145 allowing screen 105 to slide across a top surface of base 110 even more easily than it would in the absence of magnet 135, metal strip 140 and solenoid 145.

The example of FIG. 6 may provide benefits, such as decreased power consumption, over other examples. For example, it may be expected that the amount of time display 105 is to be in a stabilized position will be much greater than the amount of time in which the viewing angle of display 105 will changing. Because current is only provided to solenoid 145 during the time when the viewing angle of display 105 is being changed, current will only be supplied for short periods. Accordingly, the example of FIG. 6 may utilize less power than other examples, and be more appropriate for mobile devices, such as notebook computers and tablet computing devices.

Figure 7:
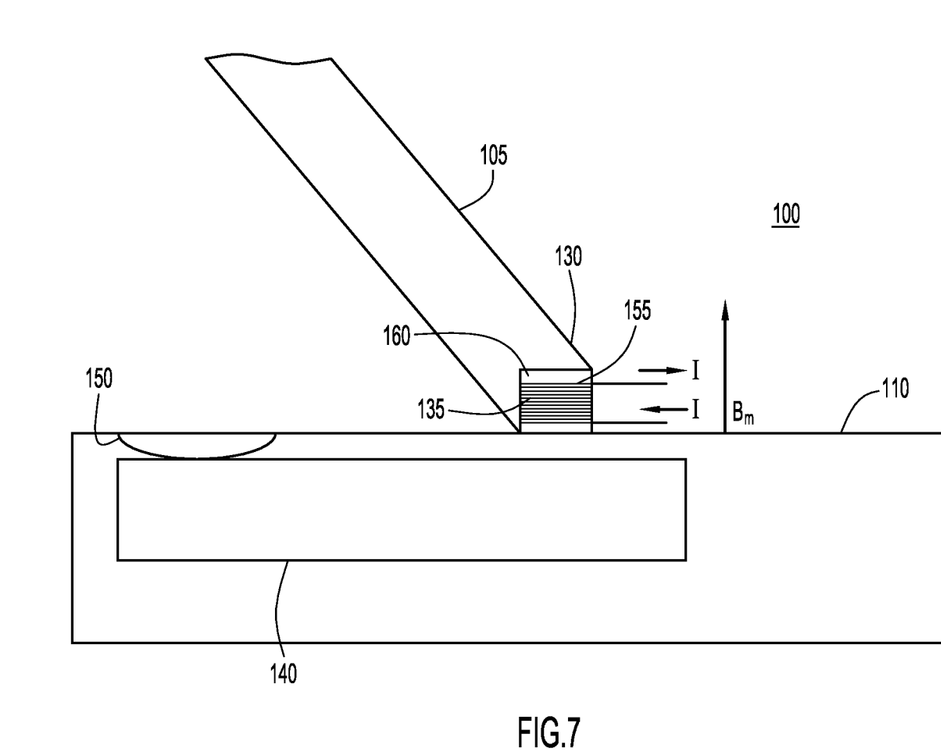
FIG. 7 illustrates a detailed view of a second example arrangement of a solenoid within a computing device that allows for stabilization and easy sliding of a display of the computing device.

With reference now made to FIG. 7, depicted therein is an example computing device implementing the techniques described herein without utilizing permanent magnets. As depicted, magnet 135 comprises an electromagnet formed from solenoid 155 and metal core 160. In contrast to the example of FIG. 6, electromagnet 135 requires current when display 105 is to be stabilized. Furthermore, when a determination is made that the position of display 105 is being changed, and peripheral portion 130 overlaps metal strip 140, the friction force between peripheral portion 130 and the surface of base 110 may be decreased by decreasing current to solenoid 155, thereby decreasing the magnet field created by magnet 135, or completely turning magnet 135 off.

While the example of FIG. 7 may require more power than other examples, such as the example of FIG. 6, other benefits may be achieved through the configuration of FIG. 7. For example, permanent magnets may become demagnetized over time, degrading their performance. Because the example of FIG. 7 utilizes electromagnet 135, consistent performance can be assured throughout the entire lifecycle of computing device 100. Additionally, because the magnetic field produced by electromagnet 135 can be varied according to the current it is supplied with, the force with which display 105 is stabilized can be varied according to user preferences.

While FIGS. 6 and 7 provide two examples, other configurations are well within the scope of the present disclosure. For example, the locations of magnet 135 and metal strip 140 may switched so that the magnet is located within base 110, and the metal strip is located within the display 105. Additionally, the metal strip 140 may be embodied in pieces of metal having shapes other than strips. Furthermore, the elements stabilizing display 105 may be located elsewhere in computing device 100. For example, magnets or other stabilizing elements may be placed in one or both of hinges 120 and 125.

Figure 8:
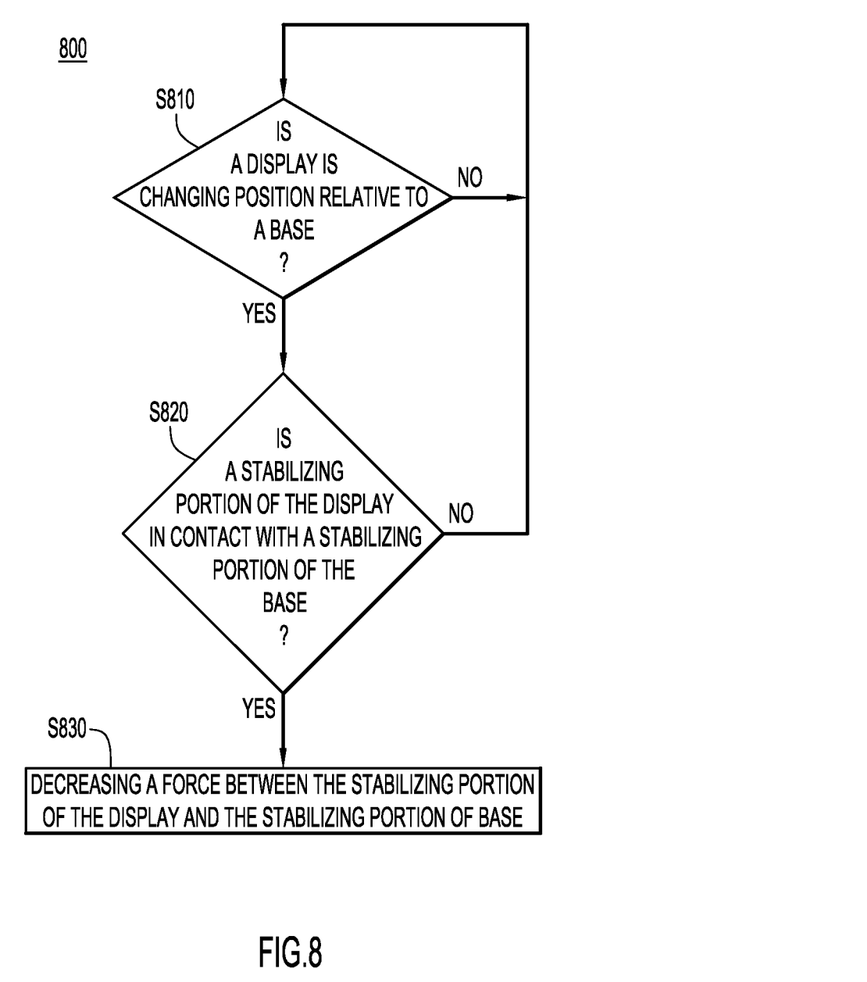
FIG. 8 is a flowchart illustrating an example process for allowing stabilization and easy repositioning of a display relative to a base.

Turning now to FIG. 8, depicted therein is a flowchart 800 illustrating a process allowing easy repositioning of a stabilized display. The process steps may be embodied in software instructions stored in memory device that when executed by a processor cause the processor to carry out the described techniques. The process begins in step S810 where it is determined, via a processor, when a display is changing position relative to a base. Determining whether or not the display is changing position relative to the base may comprise determining a vector indicative of a position for each of the display and the base, determining a relative angle between the vectors, and seeing if the angle changes over time. If the display is not changing position relative to the base, the process starts again.

The processor used to perform step S810 may be, for example, a microprocessor or microcontroller. When the process illustrated in flowchart 800 is implemented in a general purpose computing device, such as a notebook computer, the central processing unit (CPU) may be used to carry out the determining of step S810. According to other examples, a separate integrated circuit device may be used to perform the determining.

In step S820, a determination is made as to whether or not a stabilizing portion of the display is in contact with a stabilizing portion of the base. This determination may be made by receiving a signal from a switch, as described in reference to FIGS. 4*a-c* above. Furthermore, while step S820 is shown taking place after step S810, the order of these steps may be reversed, or they make take places concurrently.

In step S830, a force between the stabilizing portion of the display and the stabilizing portion of the base may be decreased when the display is both moving relative to the base, and the stabilizing portion of the display is in contact with the stabilizing portion of the base.

Figure 9:
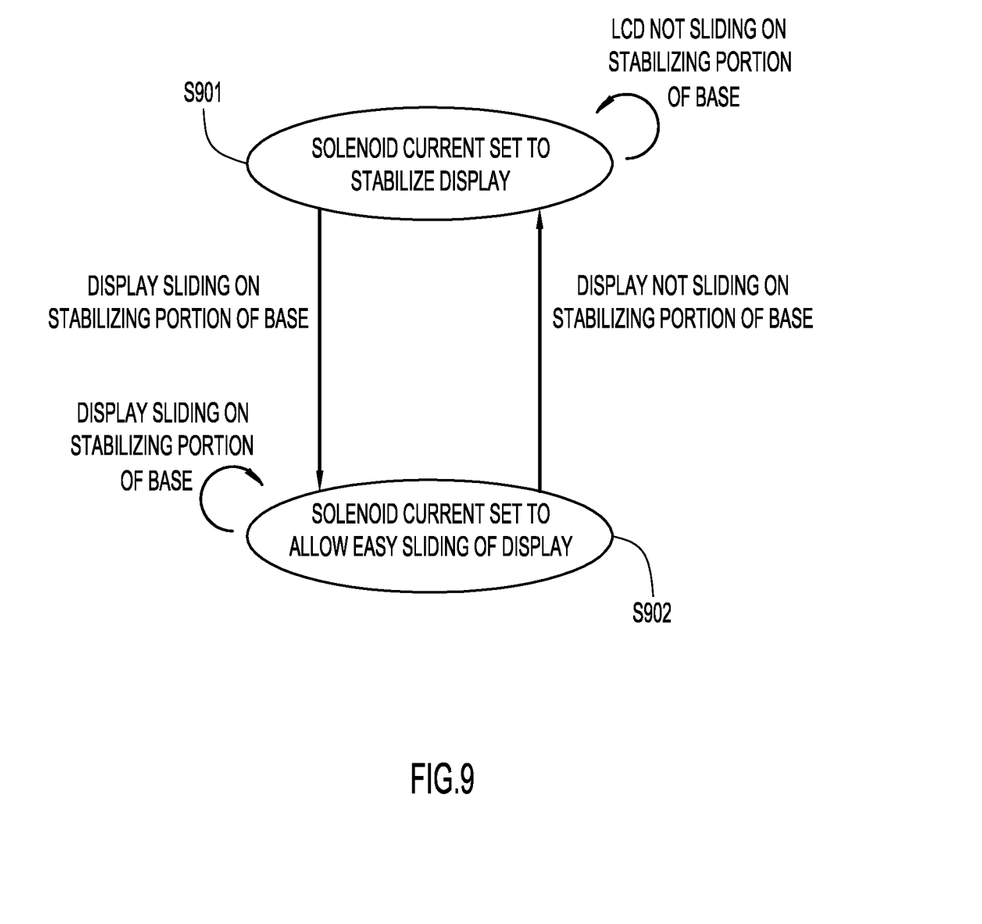
FIG. 9 is a state diagram showing the possible states for a solenoid configured to allow stabilization and easy repositioning of a display relative to a base.

Referring to FIG. 9, depicted therein is a state diagram illustrating the two possible states for a solenoid according to the relative positions and motions of a display and a base. Specifically, in state S901 a solenoid current is set to stabilize the display when the display is not moving relative to the base, in this case sliding relative to the base, and when the display contacts the base at a stabilizing portion of the base. In state S902 the solenoid is set to allow easy sliding of the display when the display is either not moving relative to the base, in this case sliding on the base, or when the display is not in contact with a stabilizing portion of the base. Accordingly, the state of the solenoid will change from state S901 to state S902 only when the display is both sliding on the base and contacting the base at a stabilizing portion of the base. On the other hand, if the display and base are in state S902, meaning the display is sliding relative to the base and in contact with a stabilizing portion of the base, the state will change to state S901 if either the display ceases sliding relative to the base or the display ceases to contact the base at a stabilizing portion of the base. In other words, unless the display is both sliding relative to the base and contacting the base at a stabilizing portion of the base, the state for the solenoid will remain in state S902.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. Additionally, the techniques described herein may be embodied in software instructions stored in memory device that when executed by a processor cause the processor to carry out the described techniques. The memory may comprise read only memory (ROM), random access memory (RAM), magnetic disk storage media devices, optical storage media devices, flash memory devices, electrical, optical, or other physical/tangible (e.g., non-transitory) memory storage devices. The scope of the invention should therefore be determined not with reference to the description above, but with reference to the appended claims, along with their full range of equivalents.

What is claimed is:

1. A method, applied to a computing device comprising a display, a base, and components that allow repositioning of the display relative to the base, comprising:
    determining, via a processor, when the display is changing position relative to the base;
    determining, via the processor, when a stabilizing portion of the display is in contact with a stabilizing portion of the base; and
    decreasing a force between the stabilizing portion of the display and the stabilizing portion of the base when the display is changing position relative to the base and when the stabilizing portion of the display is in contact with the stabilizing portion of the base, and wherein decreasing the force between the stabilizing portion of the display and the stabilizing portion of the base is in response to determining that the display is changing position relative to the base and determining that the stabilizing portion of the display is in contact with the stabilizing portion of the base.

2. The method of claim 1, wherein the step of determining when the display is changing position relative to the base comprises:
    determining a first angle between a vector indicative of a position of the display and a vector indicative of a position of the base;
    determining a second angle between a second vector indicative of the position of the display and a second vector indicative of the position of the base; and
    determining a difference between the first angle and the second angle.

3. The method of claim 1, wherein the step of decreasing the force comprises altering the current provided to a solenoid.

4. The method of claim 3, wherein the solenoid surrounds at least one of a permanent magnet or a ferromagnetic material.

5. The method of claim 1, wherein the step of decreasing the force comprises decreasing a magnetic force between a magnet located in one of the display and the base, and a piece of metal located in the other of the display and the base.

6. The method of claim 5, wherein the step of decreasing the magnetic force comprises increasing current to a solenoid surrounding the piece of metal.

7. The method of claim 5, wherein the step of decreasing the magnetic force comprises decreasing current to a solenoid surrounding the magnet.

8. The method of claim 5, wherein the step of determining when the stabilizing portion of the display is in contact with the stabilizing portion of the base comprises determining when the magnet overlaps the piece of metal in a direction normal to a sliding direction of the display relative to the base.

9. The method of claim 8, wherein the step of determining when the magnet overlaps the piece of metal in a direction normal to sliding direction of the display relative to the base comprises receiving a signal from a switch, wherein the switch is activated through the magnetic interactions of the magnet and the piece of metal.

10. The method of claim 1, wherein the step of determining when the display is changing position relative to the base comprises determining the relative position of the display and the base according to at least one accelerometer.

11. The method of claim 1, further comprising:
determining, via the processor, that the display is not changing position relative to the base or the stabilizing portion of the display is not in contact with the stabilizing portion of the base; and
increasing the force between the stabilizing portion of the display and the stabilizing portion of base.

12. A method, applied to a computing device comprising a display, a base, and components that allow repositioning of the display relative to the base, comprising:
determining, via a processor, when the display is changing position relative to the base;
determining, via the processor, when a stabilizing portion of the display is in contact with a stabilizing portion of the base; and
decreasing a force between the stabilizing portion of the display and the stabilizing portion of the base when the display is changing position relative to the base and when the stabilizing portion of the display is in contact with the stabilizing portion of the base,
wherein:
the stabilizing portion of the display is in sliding contact with the stabilizing portion of the base, and
decreasing the force comprises decreasing a frictional force between the stabilizing portion of the display and the stabilizing portion of the base.

13. The method of claim 12, wherein the step of decreasing the force comprises decreasing a magnetic force between a magnet located in one of the display and the base, and a piece of metal located in the other of the display and the base.

14. An apparatus, comprising:
a screen;
a base;
a processor, configured to:
determine when the display is changing position relative to the base;
determine when a stabilizing portion of the display is in contact with a stabilizing portion of the base; and
decrease a force between the stabilizing portion the display and the stabilizing portion of the base when the display is changing position relative to the base and when the stabilizing portion of the display is in contact with the stabilizing portion of the base, and wherein the decrease in the force between the stabilizing portion of the display and the stabilizing portion of the base is in response to the determination that the display is changing position relative to the base and the determination that the stabilizing portion of the display is in contact with the stabilizing portion of the base.

15. The apparatus of claim 14, wherein:
the display comprises a first accelerometer; and
the base comprises a second accelerometer,
wherein the processor is configured to determine when the display is changing position relative to the base according to the first and second accelerometers.

16. An apparatus, comprising:
a screen;
a base:
a processor, configured to:
determine when the display is changing position relative to the base;
determine when a stabilizing portion of the display is in contact with a stabilizing portion of the base; and
decrease a force between the stabilizing portion the display and the stabilizing portion of the base when the display is changing position relative to the base and when the stabilizing portion of the display is in contact with the stabilizing portion of the base,
wherein:
the display comprises one of a magnet or a piece of metal;
the base comprises the other of the magnet and the piece of metal;
the stabilizing portion of the display comprises a portion of the display contacting the base when the magnet overlaps the piece of metal in a direction normal to a sliding direction of the display relative to the base; and
the stabilizing portion of the base comprises a portion of the base contacting the display when the magnet overlaps the piece of metal in a direction normal to the sliding direction of the display relative to the base.

17. The apparatus of claim 16, further comprising a solenoid surrounding at least one of the magnet and the piece of metal; wherein the processor is configured to decrease the force between the stabilizing portion of the display and the stabilizing portion of the base by altering the current to the solenoid.

18. The apparatus of claim 17, wherein:
the solenoid surrounds the magnet; and
the processor is configured to decrease the current to the solenoid to decrease the force between the stabilizing portion of the display and the stabilizing portion of the base.

19. The apparatus of claim 17, wherein:
the solenoid surrounds the piece of metal; and
the processor is configured to increase the current to the solenoid to decrease the force between the stabilizing portion of the display and the stabilizing portion of the base.

20. The apparatus of claim 16 further comprising a switch, wherein:
a state of the switch is configured to change when the magnet overlaps the strip of metal in a direction normal to the sliding direction of the display relative to the base; and
the processor is configured to determine when the stabilizing portion of the display is in contact with the stabilizing portion of the base according to the state of the switch.

* * * * *